United States Patent [19]

Tuusa

[11] Patent Number: 4,907,144
[45] Date of Patent: Mar. 6, 1990

[54] FREQUENCY CONVERTER AND A METHOD OF APPLYING SAME

[75] Inventor: Heikki Tuusa, Tampere, Finland

[73] Assignee: Kone Oy, Finland

[21] Appl. No.: 207,834

[22] Filed: Jun. 17, 1988

[30] Foreign Application Priority Data

Jun. 17, 1987 [FI] Finland .................................. 872705

[51] Int. Cl.⁴ ............................................. H02M 5/45
[52] U.S. Cl. ........................................ 363/37; 363/41; 363/98; 318/810; 318/811
[58] Field of Search ..................... 363/37, 41, 96–98, 363/132, 136, 85, 87, 89, 10; 318/810, 811

[56] References Cited

U.S. PATENT DOCUMENTS 4,578,746 3/1986 Gyugyi et al. .................. 318/810 X
4,581,696 4/1986 Gyugyi et al. .................. 318/810 X Primary Examiner—Patrick R. Salce
Assistant Examiner—Emanuel Todd Voeltz
Attorney, Agent, or Firm—Nixon & Vanderhye

[57] ABSTRACT

A method for controlling a frequency converter having multi-phase output is disclosed and a frequency converter for applying the method. In order to achieve a good waveform the currents of the frequency converter are controlled via modulation in such manner that the current modulation periods of each phase are interlaced with the modulation periods of the other phases.

8 Claims, 7 Drawing Sheets

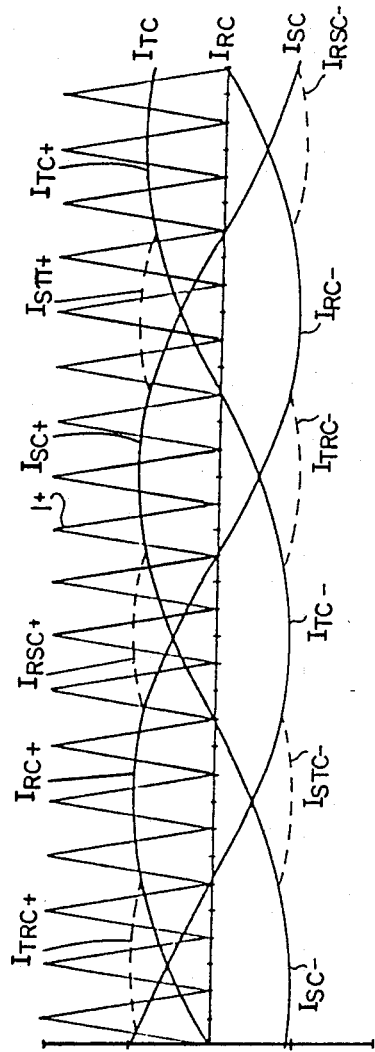
Fig.2a
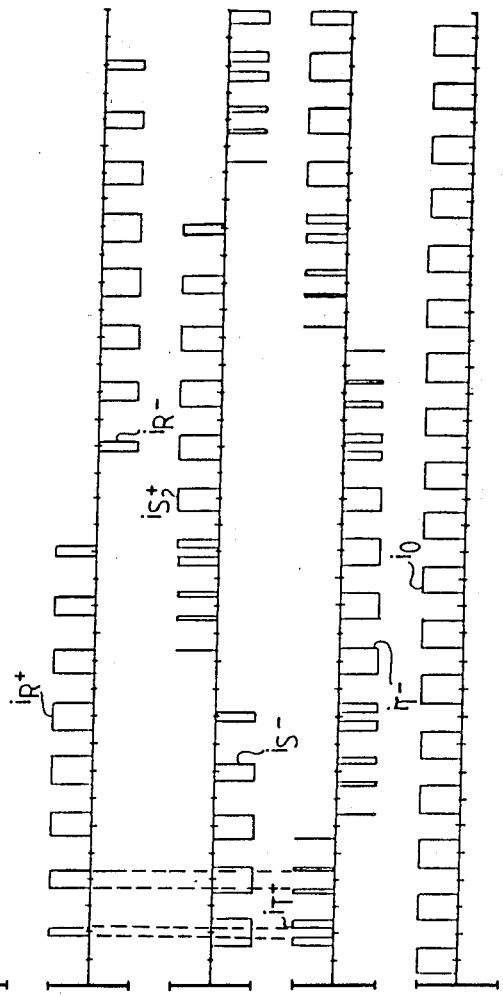
Fig.2b
Fig.2c
Fig.2d
Fig.2e

FREQUENCY CONVERTER AND A METHOD OF APPLYING SAME

FIELD OF THE INVENTION

The present invention relates generally to a method for controlling a frequency converter, and to a frequency converter designed to apply the method. The frequency circuit described herein has multiple output times at different phases of the same frequency.

DESCRIPTION OF RELATED ART

In the function of a frequency converter, a constant-frequency a.c. mains voltage is connected to a rectifying unit. The power is taken from the mains, and the rectified voltage (d.c.) is converted by an inverting unit into a variable-frequency a.c. voltage to feed the load. In frequency converters, either the current or the voltage is controlled. The desired amplitude and frequency values are set for the current or the voltage, while the value of the other quantity, which is not controlled, is determined by the supply and the loading condition.

In voltage-controlled frequency converters the desired voltage for feeding the load is produced for example via pulse-width modulation, whereby sinusoidal and triangular waves are compared to produce the control pulses for the semiconductor switches in the power stage of the frequency converter. A disadvantage with voltage-controlled frequency converters is the noise produced in the motors constituting the load, such noise being the result of the waveform of the voltage fed into the load.

If current is the controlled quantity in the frequency converter, the semiconductor control pulses can not be produced in the manner referred to above. The reason is that in current-controlled frequency converters current can only flow in one direction at both ends of the bridge circuits. Moreover, a path must be provided for the current of the intermediate d.c. circuit at all times, and when the parallel-connected transistors of the bridge are driven simultaneously, current can only flow through the one of the transistors which has the higher collector-emitter voltage.

If the current of a current controlled inverter is controlled by a method similar to that by which the voltage is controlled in voltage controlled inverters, a good waveform for the mains and load currents cannot be achieved.

A method for controlling a frequency converter in which the currents of the frequency converter are controlled via modulation in such a manner that the control pulses of each phase are interlaced with the control pulses of the other phases is known.

By modulating the currents by such method a good waveform is achieved for both mains and load currents and the generation of harmonics is reduced to a minimum.

It is also known in the art to provide a path for the current when the momentary values of each phase current taken from the mains and supplied to the load are zero, by turning on the semiconductor switches of one of the phases when normally none of the switches is conducting.

The modulation circuits of known current controlled inverters, as the modulation circuits in the inverters of U.S. Pat. Nos. 4,578,746 and 4,581,696, are made by using counters and dividers. Any wave form can be achieved by counters and dividers. The disadvantage is that a failure when counting or dividing may cause a harmful disturbance in the transistor bridge.

SUMMARY OF THE INVENTION

An object of the present invention is to minimize failure of modulation circuits of multiphase current controlled frequency converters having pulse controlled semiconductor switches by using a simple modulation method which method makes it possible to use simple components as comparators and logic gates in said modulation circuit.

BRIEF DESCRIPTION OF THE DRAWINGS

The invention will now be described in further detail with reference to the accompanying drawings in which:

FIG. 2a illustrates sinusoidal current references and a positive triangular carrier wave.

FIG. 2b shows the preliminary pulses for the R-phase.

FIG. 2c shows the preliminary control pulses for the S-phase.

FIG. 2d shows the preliminary control pulses for the T-phase.

FIG. 2e shows the auxiliary control pulses for the flywheel diode function of the R-phase.

PREFERRED EMBODIMENTS

Figure 1:
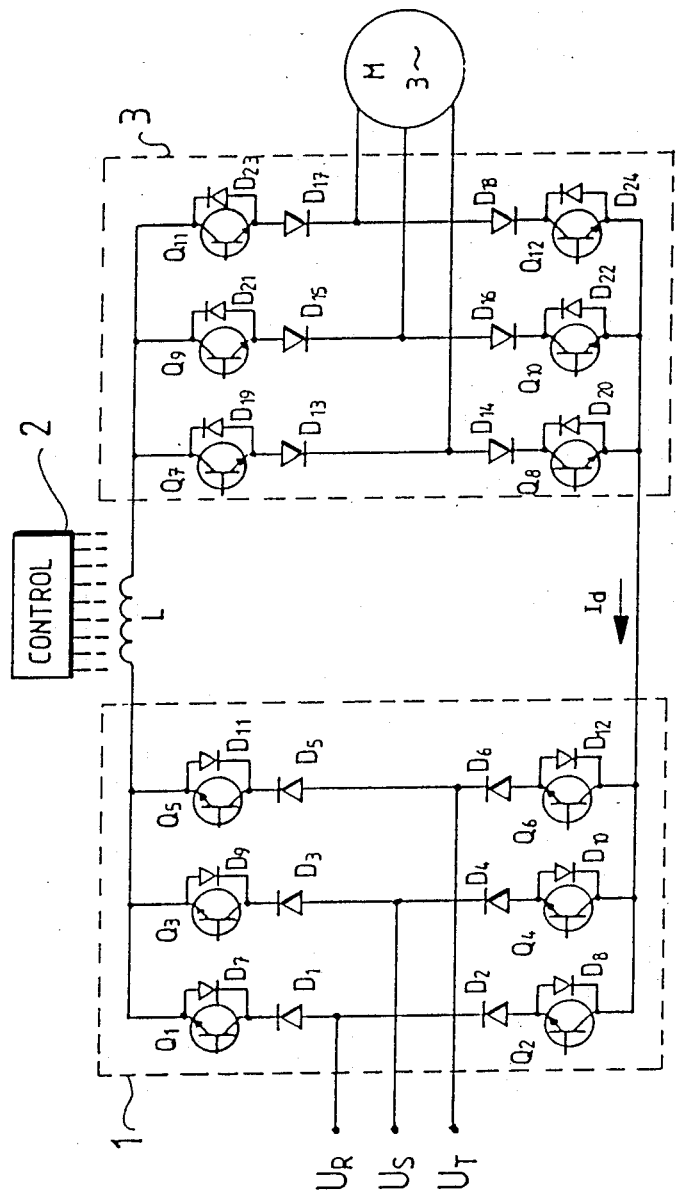
FIG. 1 illustrates a current-controlled frequency converter to which the modulator and modulation method of the present invention may be applied.

In a preferred embodiment of the method of the invention in the first phase (R) preliminary control pulses (iR+) for the semiconductor switch conducting during the positive half-cycle of the phase and preliminary control pulses (iR−) for the semiconductor switch conducting during the negative half-cycle are produced separately from the modulation reference (MR) which is the same as the current reference (IRC). This is accomplished by comparing the positive half-cycle of the modulation reference (MR+) for the semiconductor switch conducting during the positive half-cycle to a positive triangular wave and the negative half-cycle of the modulation reference (MR−) for the semiconductor switch conducting during the negative half-cycle to a negative triangular wave (I+). The preliminary control pulses (iS+, iS−) for the second phase (S) semiconductor switches are produced by summing the positive parts of the current references (IRC+, ISC+) of the first and second phases on the one hand and the negative parts (IRC−, ISC−) of the same phases on the other hand and comparing the positive sum (modulation reference MS+) thus obtained to a positive triangular wave and the negative sum (modulation reference MS−) to a negative triangular wave and removing from the thus formed modulation pulses the periods during which the preliminary control pulses are being applied to the corresponding first-phase semiconductor switches. The preliminary control pulses (iT+, iT−) for the third-phase (T) semiconductor switches are produced by summing the positive parts of the current references (IRC+, ISC+, ITC+) of the first, second and third phases (R, S, T) on the one hand and the negative parts (IRC−, ISC−, ITC−) of the same phases on the other and comparing the positive sum (modulation reference MT+) thus obtained to a positive triangular wave and the negative sum (modulation reference MT−) to a negative triangular wave and removing from the thus formed modulation pulses the periods during which the control pulses is being applied to the corresponding semiconductor switches of the first and second phases.

An alternative preferred embodiment of the method of the invention is characterized in that the modulation is implemented using combined modulation references (MR, MS, MT) produced by removing from the curves (MS+, MS−) of the second phase the parts which coincide with the modulation references (MR+, MR−) of the first phase and from the third-phase curves (MT+, MT−) the parts which coincide with the curves of the first and second phases.

A preferred embodiment of the modulation circuit of a frequency converter applying the method of the invention is characterized in that the control unit contains NOR-gates or similar devices, the first (gate 15a) of which eliminates those parts of the modulation pulses for the transistor conducting during the positive half-cycle of the second phase (S) which coincide with the preliminary control pulses for the transistor conducting during the positive half-cycle of the first phase (R). The second (gate 15b) eliminates those parts of the modulation impulses for the transistor conducting during the negative half-cycle of the second phase (S) which coincide with the preliminary control pulses for the transistor conducting during the negative half-cycle of the first phase (R). The third (gate 15c) eliminates those parts of the modulation pulses for the transistor conducting during the positive half-cycle of the third phase (T) which coincide with the preliminary control pulses for the transistors conducting during the positive half-cycles of the first and second phases (R, S), while the fourth (gate 15d) eliminates those parts of the modulation pulses for the transistor conducting during the negative half-cycle of the third phase (T) which coincide with the preliminary control pulses for the transistors conducting during the negative half-cycles of the first and second phases (R, S).

According to the present invention a method for controlling a frequency converter, wherein the currents of the frequency converter are controlled via modulation in such a manner that the current modulation periods of each phase are interlaced with the modulation periods of the other phases.

According to a further aspect of the invention a frequency converter comprising a mains bridge and a motor bridge both having controllable semiconductor switches, and a control unit for controlling said semiconductor switches, whereby currents in the frequency converter are controllable via modulation in such manner that the modulation periods of each phase can be interlaced with the modulation periods of the other phases.

FIG. 1 shows a current-controlled frequency converter and a motor constituting the load. The frequency converter contains a rectifier bridge 1 which rectifies the constant-frequency mains supply phase voltages UR. US and UT to produce the d.c. current for the d.c. circuit. The mains rectifier bridge consists of diodes D1–D6 and transistors Q1–Q6, which are connected in series with the said diodes and inverse-parallel connected flywheel diodes D7–D12. The transistors Q1–Q6 are controlled by the control unit 2.

A direct current Id, which is filtered by the inductance L, flows in the d.c. circuit which feeds the motor bridge 3. The motor bridge consists of diodes D13–D18 and transistors Q7–Q12, which are connected in series with the diodes, and inverse-parallel connected flywheel diodes D19–D24. Transistors Q7–Q12 are also controlled by the control unit 2. In the motor bridge 3 a three-phase current is produced to feed the squirrel-cage motor M.

The control unit 2 produces the transistor control pulses separately for each of the two bridges. The control unit 2 modulates both the current taken by the frequency converter from the mains and the current supplied to the load. This modulation is so implemented that the modulation periods of each phase are interlaced with the control pulses of the transistors of the other two phases. During each modulation period, which period corresponds to the period of the carrier 7 triangular wave, the average value of the phase current corresponds to the desired waveform of the current, e.g. a sine wave. A path is provided for the current even when the momentary values of the currents taken from the mains and supplied to the load M are zero.

Figure 3A:
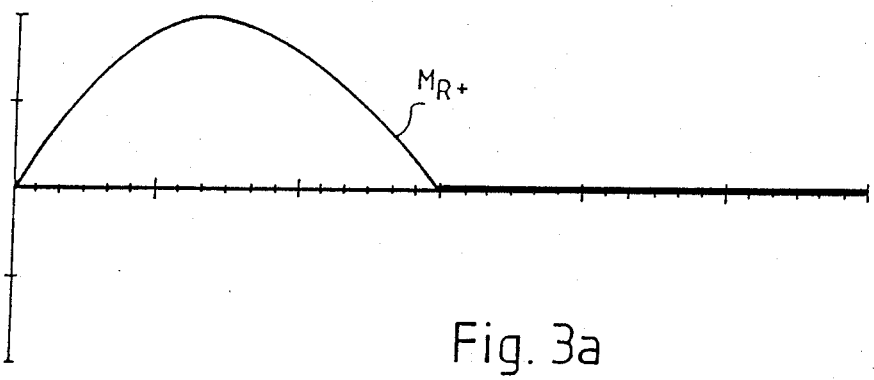
FIG. 3a shows the positive modulation reference (MR+) for the R-phase.
Figure 3B:
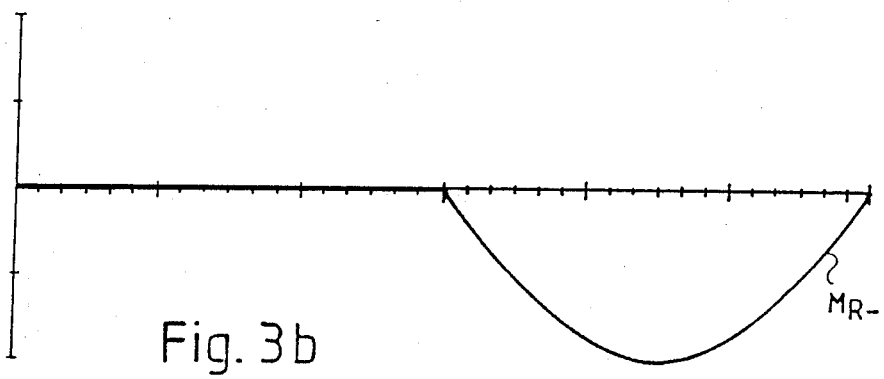
FIG. 3b shows the negative modulation reference (MR−) for the R-phase.

When the control current waveforms desired are sinusoidal current references IRC, ISC and ITC, as shown in FIG. 2a, the modulating action of the circuit is as follows. (FIG. 2a also show positive and negative sums IRSC+, IRSC−, ISTC+, ISTC−, ITRC+ and ITRC− of current references which sums are combined to form the modulation references MR+, MR−, MS+, MS−, MT+ and MT− which modulation references are shown in FIG. 3f). From the R-phase current reference IRC, separate preliminary control pulses iR+ and iR− of the transistors Q1 or Q7 conducting during the positive half-cycle of the branch and for the transistors Q2 or Q8 conducting during the negative half-cycle are produced by half-bridge rectifying the current reference IRC and thus forming the half cycles IRC+ and IRC− of the current reference. The modulation reference MR+ of FIG. 3a is the same as the half cycle IRC+ and the modulation reference MR− of FIG. 3b is the same as the half cycle IRC− of the current reference IRC. The modulation reference MR+, shown in FIG. 3a for the transistor conducting during the positive half-cycle is compared to a positive triangular wave I+, shown in FIG. 2a, and the modulation reference MR− shown in FIG. 3b, for the transistor conducting during the negative half-cycle is compared to a negative triangular wave, which is not shown in the drawings, but which is obtained from the positive wave by means of an inverting amplifier. This results in the preliminary control pulses iR+ and iR− in FIG. 2b.

The modulation periods for the other two phases are produced in a corresponding manner, as described below.

The preliminary control pulses for the transistors Q3 and Q4 or Q9 and Q10 in the S-phase are produced as follows. The positive current references IRC+ and ISC+ for phases R and S are added together and the sum obtained is a modulation reference MS+ and it is compared to the positive triangular wave. Similarly, the negative current references IRC− and ISC− for phases R and S are added together and the sum obtained is a modulation reference MS− and it is compared to the negative triangular wave. Thus, modulation pulses are obtained which correspond to the sum of the preliminary control pulses for the transistors in phases R and S for the modulation period in question. Removing the portions of these modulation pulses during which the R-phase transistors are being driven results in the preliminary control pulses iS+ and iS− for phase S as shown in FIG. 2c, in which the positive preliminary control pulses control the transistors conducting during the positive half-cycle and the negative preliminary control pulses control the transistors conducting during the negative half-cycle. When the modulation references of the half-cycles of phases R and S occur simultaneously, the control pulses of S-phase transistor conducting during the positive half-cycle are located to both sides of the preliminary control pulses of an R− phase transistor conducting during the positive half-cycle and the control pulses of S-phase transistor conducting during the negative half-cycle are located to both sides of the preliminary control pulses of R-phase transistor conducting during the negative half-cycle. Thus the duration of the modulation pulses during the modulation period remains at the desired value, that is to say they correspond to the sinusoidal current reference ISC.

The control signals for the transistors Q5 and Q6 or Q11 and Q12 in the T-phase are produced as follows. The positive current references IRC+, ISC+ and ITC+ for phases R and S and T are added together and the sum obtained is compared to the positive triangular wave. Similarly, the negative current references IRC−, ISC− and ITC− for phases R and S and T are added together and the sum obtained (i.e. the modulation reference MT−) is compared to the negative triangular wave. The resulting modulation pulses correspond to the sum of the preliminary control pulses for the transistors in phases R, S and T for the modulation period in question. Removing the portions of these modulation pulses during which the transistors of the R and S phases are being driven results in the preliminary control pulses iT+ and iT− for phase T as shown in FIG. 2d, in which the positive pulses control the transistors conducting during the positive half-cycle and the negative pulses control the transistors conducting during the negative half-cycle. The preliminary control pulses for the T-phase transistors conducting during the positive half-cycle now occur in the intervals between the control pulses for the R and S phase transistors conducting during the positive half-cycle and the preliminary control pulses for the T-phase transistors conducting during the negative half-cycle occur in the intervals between the preliminary control pulses for the R and S phase transistors conducting during the negative half-cycle.

Moreover, both transistors of the rectifying or inverting bridges of the R-phase are turned on in the intervals in which none of the bridge transistors conducting during the positive and negative half-cycles are receiving their normal control pulses. This ensures that a path through the bridge is provided for the current Id of the d.c. circuit. To provide for these flywheel diode actions of the frequency converter, an additional pulse train iOas shown in FIG. 2e for controlling the R-phase transistors is produced.

Figure 3C:
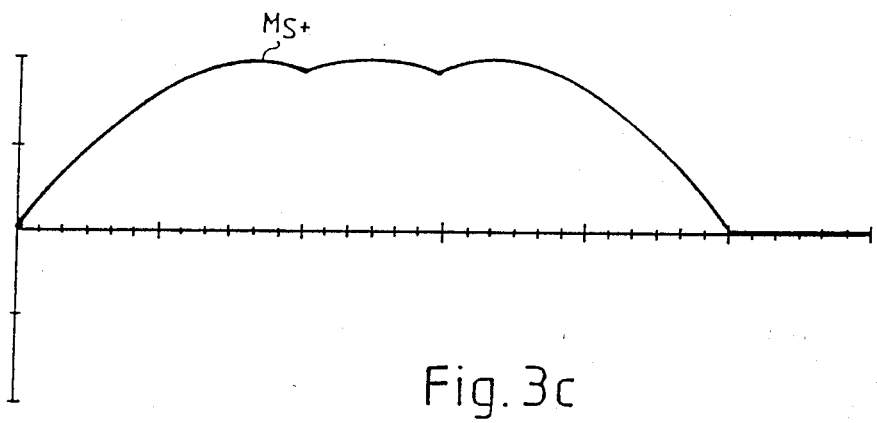
FIG. 3c shows the positive modulation reference (MS+) for the S-phase.
Figure 3D:
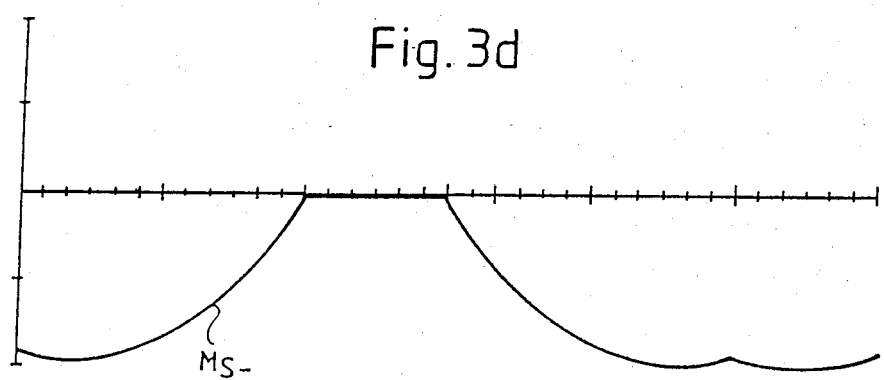
FIG. 3d shows the negative modulation reference (MS−) for the S-phase.
Figure 3E:
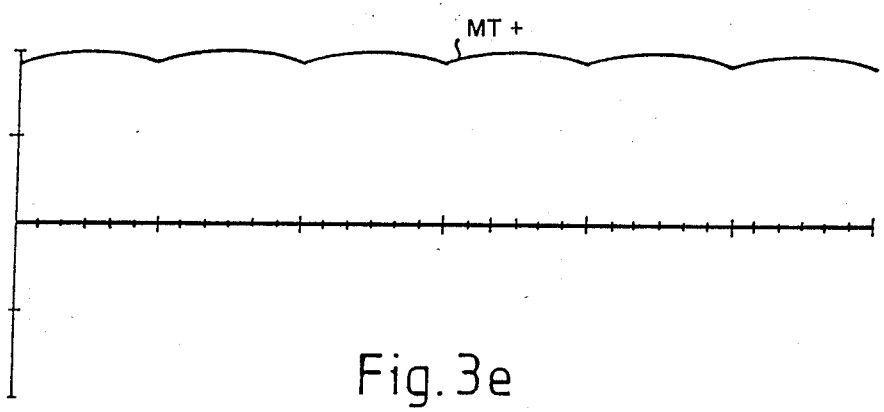
FIG. 3e shows the positive modulation reference (MT+) for the T-phase.
Figure 3F:
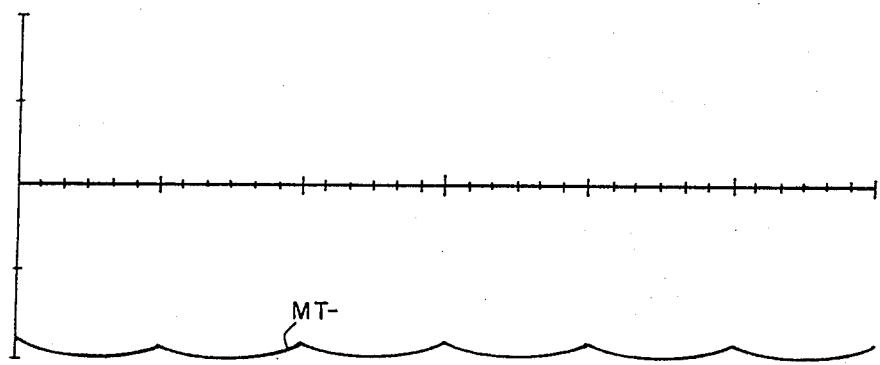
FIG. 3f shows the negative modulation reference (MT−) for the T-phase.

When the modulation references for different transistors are generated from the desired sinusoidal current references as described above, the resulting waveforms are as shown in FIGS. 3a–3f, of which FIG. 3a shows the positive modulation reference MR+ for phase R, FIG. 3b the negative modulation reference MR− for phase R, FIG. 3c the positive modulation reference MS+ for phase S, FIG. 3d the negative modulation reference MS− for phase S, FIG. 3e the positive modulation reference MT+ for phase T, and FIG. 3f the negative modulation reference MT− for phase T. As described above, the transistors of the bridge conducting during the positive half-cycle and the transistors of the bridge conducting during the negative half-cycle have a definite conducting priority R-S-T, if an attempt is made to make them conduct simultaneously, it is possible to remove the parts of the S-phase modulation references MS+ and MS− in FIGS. 3c and 3d which coincide with the modulation references MR+ and MR− for phase R as well as it is possible to remove the parts of the T-phase modulation references MT+ and MT− in FIGS. 3e and 3f which coincide with the modulation references for phases R and S. By combining the modulation references described for the transistors conducting during the positive and negative half-cycles of each phase we obtain the combined modulation references MR, MS and MT shown in FIGS. 4a–4c. If the sinusoidal current references IRC, ISC and ITC are replaced with these combined modulation references MR, MS and MT, no half-wave rectifiers or adder circuits are needed in the modulation circuits described below and hence the probability of failure is reduced. FIG. 5 shows a block diagram of the modulation circuit. FIG. 6 shows the modulation circuit itself. A separate modulation circuit is provided in the control unit 2 for each of the two bridges.

Figures 4A, 4B, 4C:
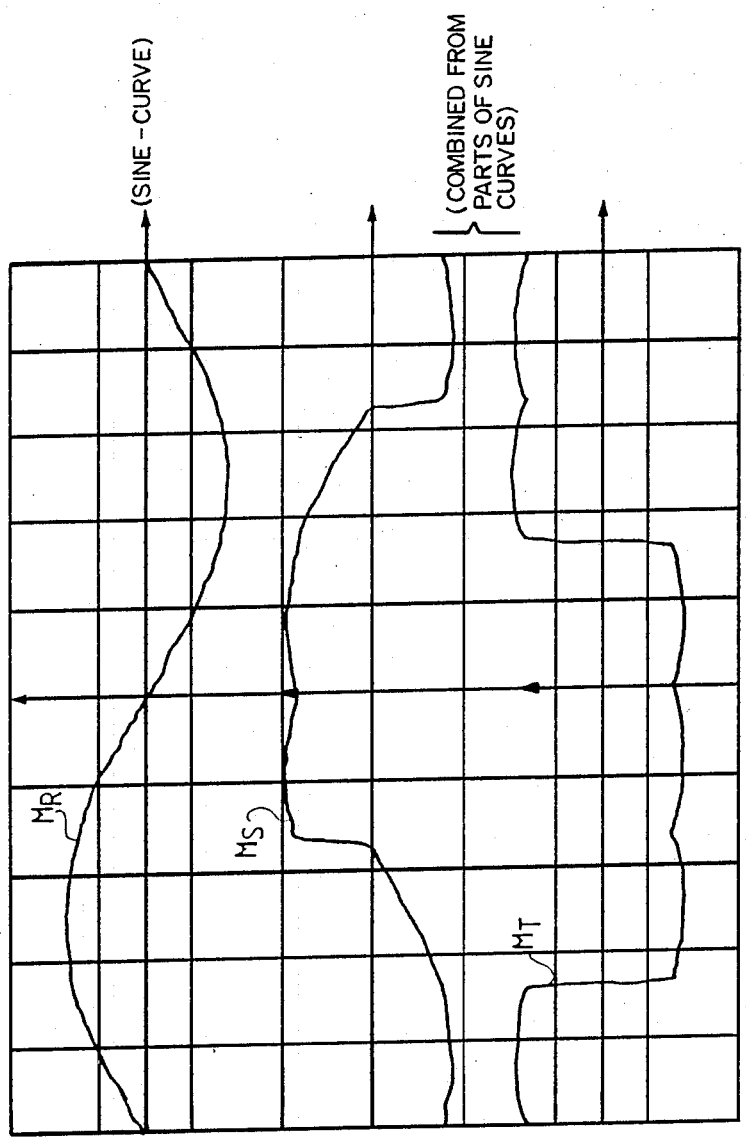
FIG. 4a shows the modulation references (MR) for the R-phase.
FIG. 4b shows the modulation references (MS) for the S-phase.
FIG. 4c shows the modulation references (MT) for the T-phase.
Figure 5:
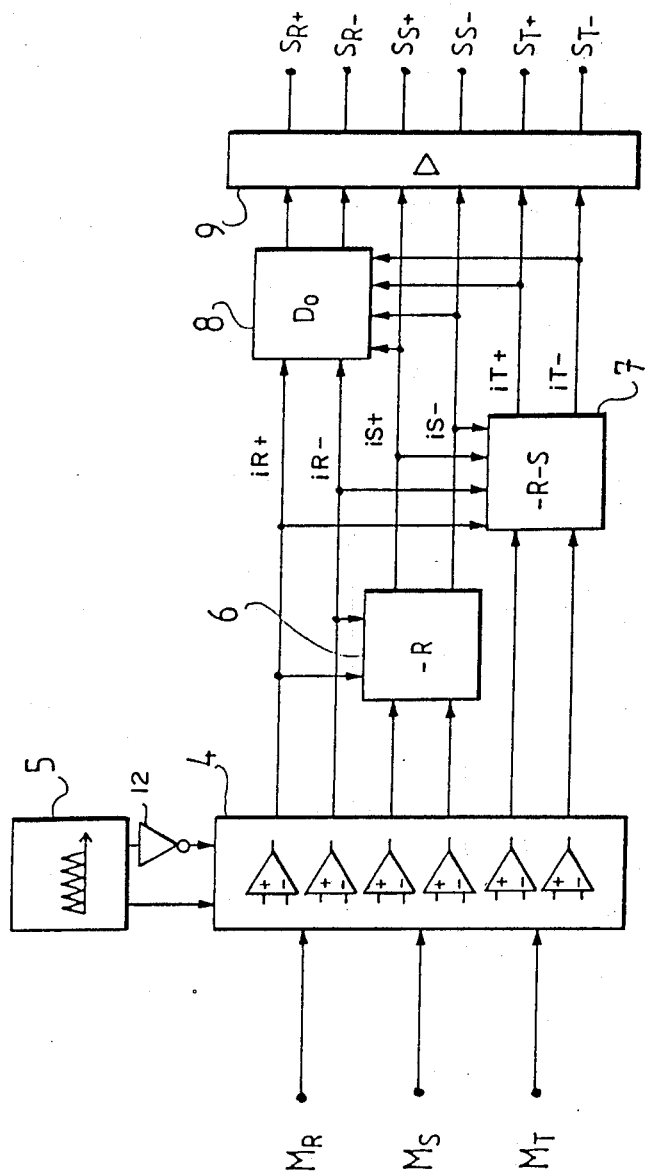
FIG. 5 is a block diagram of the modulation circuit.
Figure 6:
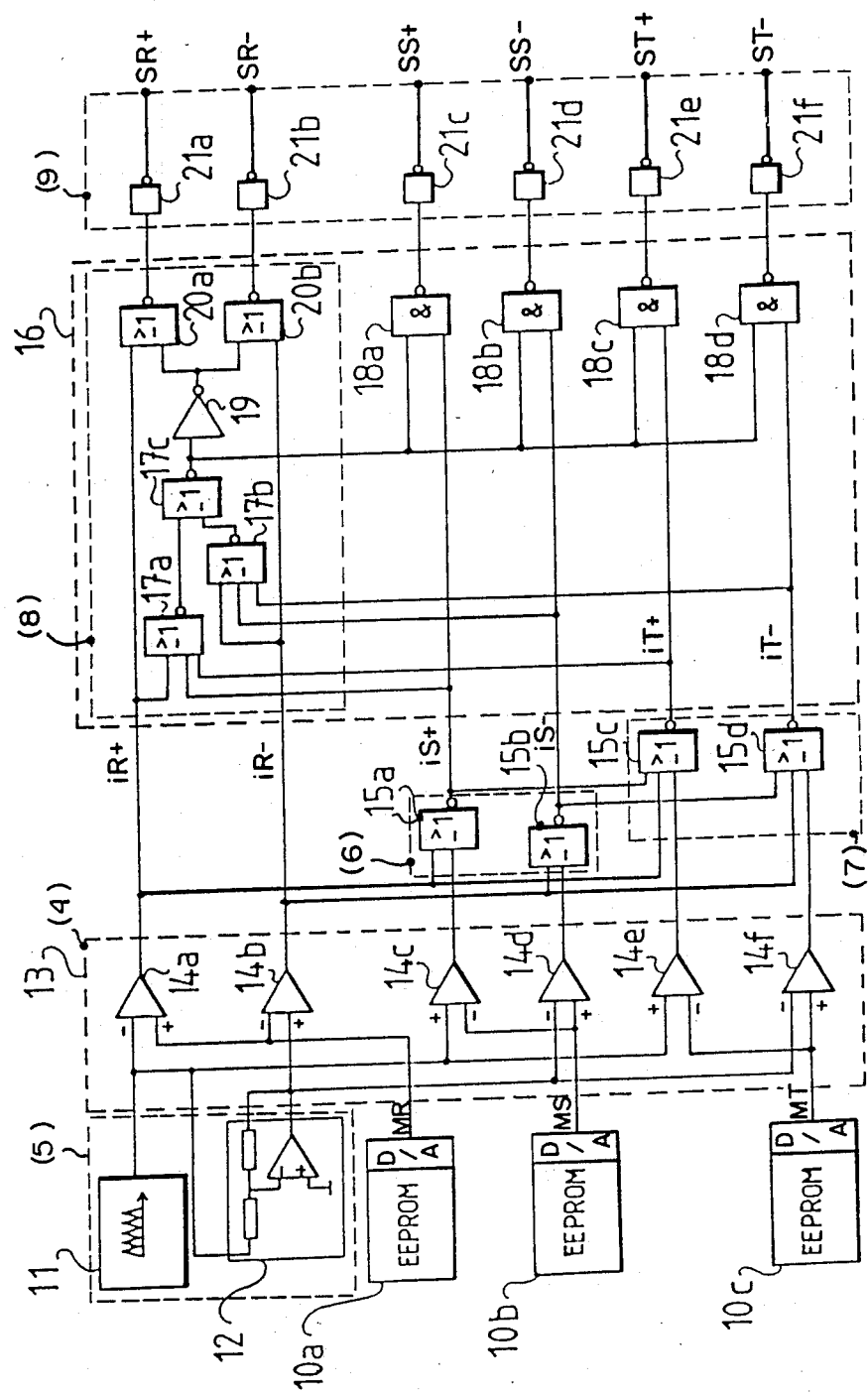
FIG. 6 shows the modulation circuit.

The modulation system depicted in FIG. 5 is effected in the manner described above, by comparing a positive and negative triangular wave of a frequency of e.g. 2 kHz, supplied by a carrier generator 5, to the combined modulation references MR, MS and MT shown in FIGS. 4a–4c. For phase R, separate preliminary control pulses iR+ and iR− are produced for the transistor conducting during the positive half-cycle and for the transistor conducting during the negative half-cycle. The positive modulation reference MR+ for the transistor conducting during the positive half-cycle is compared to the positive triangular wave, and the negative modulation reference MR− for the transistor conducting during the negative half-cycle is compared to the negative triangular wave in the modulator 4, into which the combined modulation reference MR and the triangular waves are fed.

For the S-phase transistors conducting during the positive half-cycle and those conducting during the negative half-cycle, the preliminary control pulses iS+ and iS− respectively are produced by the modulator 4 by comparing the combined modulation reference MS to the positive and the negative triangular wave and, after the comparison, feeding the resulting pulses into a differential circuit (−R) 6 to remove those parts of them which coincide with the control pulses for the R-phase transistors.

For the T-phase transistors conducting during the positive half-cycle and those conducting during the negative half-cycle, the preliminary control pulses iT+ and iT− respectively are produced by the modulator 4 by comparing the combined modulation reference MT to the positive and the negative triangular wave and after such comparison feeding the modulation pulses into a differential circuit (—R—S) 7 to remove those parts of them which coincide with the control pulses for the transistors of the R and S phases.

For the R-phase bridge transistors, the flywheel diode function, which enables them to conduct when normally none of the transistors conducts, is achieved by applying the preliminary control pulses for the R-phase transistors to a flywheel diode circuit (D0) 8 which adds to these pulses the required auxiliary control pulses, shown in FIG. 2e.

Finally all the control pulses are passed to the transistor base current amplifiers through a protective amplifier 9, which ensures that the transistors can be turned off in case of malfunction.

FIG. 6 shows the current modulation circuit. The combined modulation reference MR for phase R as shown in FIG. 4a is obtained e.g. from an EPROM memory circuit 10a, the combined modulation reference MS for phase S correspondingly from another EPROM circuit 10b and the combined modulation reference MT for phase T from a third EPROM circuit 10c. The combined modulation references, the positive triangular wave, which is obtained from the carrier wave generator 11, and the negative triangular wave, which is derived from the positive wave by an inverting amplifier 12, are fed into the modulator 13. The modulator first generates the modulation pulses for the transistors conducting during the positive half-cycle by comparing the positive triangular wave to the modulation references in operational amplifiers 14a, 14c and 14e, and the modulation pulses for the transistors conducting during the negative half-cycle by comparing the negative triangular wave to the modulation references in operational amplifiers 14b, 14d and 14f. Next, the parts of the modulation pulses for the transistor conducting during the positive half-cycle of the S-phase which coincide with the preliminary control pulses for the transistor conducting during the positive half-cycle of the R-phase are removed by the NOR gate 15a acting as a differential circuit, and the parts of the modulation pulses for the transistor conducting during the negative half-cycle of the S-phase which coincide with the preliminary control pulses for the transistor conducting during the negative half-cycle of the R-phase are removed by the NOR gate 15b acting as a differential circuit. Similarly, the parts of the modulation pulses for the transistor conducting during the positive half-cycle of the T-phase which coincide with the preliminary control pulses for the transistors conducting during the positive half-cycles of the R and S phases are removed by the NOR gate 15c acting as a differential circuit, and the parts of the modulation pulses for the transistor conducting during the negative half-cycle of the S-phase which coincide with the preliminary control pulses for the transistors conducting during the negative half-cycles of the R-phase are removed by the NOR gate 15d acting as a differential circuit.

The preliminary control pulses are fed into the flywheel diode circuit 16, which provides an additional control pulses for the R-phase transistors when normally none of the transistors conduct. To achieve this, the positive preliminary control pulses are first applied to a NOR gate 17a and the negative control signals to another NOR gate 17b. The output of each of these gates is applied to a third NOR gate 17c. The output of this gate and the corresponding preliminary control pulses are applied to four NAND gates 18a–18d. This ensures that during the periods when an auxiliary control pulses for the R-phase transistors exists, no control pulses is applied to any of the transistors of the other phases, so that none of them conduct. In the R-phase, the auxiliary control pulses are obtained by applying the output of the above-mentioned NOR gate 17c via an inverting amplifier 19 to two further NOR gates 20a and 20b, the first of which receives at its other input the preliminary control pulses for the transistor conducting during the positive half-cycle and the second the preliminary control pulses for the transistor conducting during the negative half-cycle. Next all the control pulses are fed into protective amplifiers 21a–21f which invert the signals and pass them on to the transistor base current amplifiers, which are not shown in the Figures. In case of malfunction, the protective amplifiers can disconnect the control pulses to the transistors.

It will be obvious to a person skilled in the art that the invention is not restricted to the above examples of its embodiments, but that it may instead be varied within the scope of the following claims.

What is claimed is:

1. A method for controlling a frequency converter, wherein currents of the frequency converter are controlled via modulation in such a manner that control pulses of transistors of each phase are interlaced with control pulses of other phases, said method comprising the steps of:
  (a) producing in a first phase a control signal for a first semiconductor switch (Q1, Q7) conducting during the positive half-cycle of the phase and providing a control signal for a second semiconductor switch (Q2, Q8) conducting during the negative half-cycle separately from a first phase current control signal (IRC) by comparing the positive half-cycle of the current control signal for the first semiconductor switch conducting during the positive half-cycle to a positive triangular wave (I+) and the negative half-cycle of the first phase current control signal (IRC) for the second semiconductor switch conducting during the negative half-cycle to a negative triangular wave;
  (b) producing in a second phase by calculating the positive parts of the current control signal (IRC) and a second phase current control signal (ISC) to obtain a positive sum on the one hand and the negative parts of the same phases on the other hand to obtain a negative sum and comparing the positive sum thus obtained to a positive triangular wave and the negative sum to a negative triangular wave and removing from said control signals the periods during which a control signal is being applied to the corresponding first-phase first and second semiconductor switches; and
  (c) producing in a third phase, control signals for a third-phase semiconductor switch by calculating the positive parts of the first phase and second phase current control signals (IRC, ISC) and a third phase current control signal (ITC) to obtain a positive sum on the one hand and the negative parts of the same phases to obtain a negative sum on the other hand and comparing the positive sum thus obtained to a positive triangular wave and the negative sum to a negative triangular wave and removing from these third phase semiconductor switch control signals the periods during which a first or second phase control signal is being applied to the corresponding semiconductor switches of the first and second phases.

2. A method according to claim 1 wherein both current taken by the frequency converter from a main power source and current supplied to a load are controlled.

3. A method according to claim 1, wherein a path is provided for current when the momentary values of each phase current taken from mains and supplied to a load are zero, said path being provided by turning on semiconductor switches of one of the phases when normally none of the semiconductor switches is conducting.

4. A method for controlling a frequency converter, wherein currents of the frequency converter are controlled via modulation in such a manner that control pulses of transistors of each phase are interlaced with control pulses of the other phases, wherein the modulation is implemented using modulation signals (MR, MS, MT) produced by removing from the curves of the second phase the parts which coincide with the modulation signals of the first phase and from the third-phase curves the parts which coincide with the curves of the first and second phases.

5. A frequency converter comprising a main power source bridge and a motor bridge both having controllable semiconductor switches and a control unit for controlling said semiconductor switches, whereby currents in the frequency converter are controllable via modulation in such manner that modulation periods of each phase can be interlaced with modulation periods of the other phases, wherein:

the control unit contains first, second, third and fourth gate means, said first gate means (15a) eliminating those parts of a control signal for a transistor conducting during the positive half-cycle of a second phase which coincides with a control signal for a transistor conducting during the positive half-cycle of a first phase, the second gate means (15b) for eliminating those parts of the control signal for a transistor conducting during the negative half-cycle of a second phase which coincide with a control signal for a transistor conducting during the negative half-cycle of the first phase, the third gate means (15c) for eliminating those parts of the control signal for the transistor conducting during the positive half-cycle of a third phase which coincides with control signals for the transistors conducting during the positive half-cycles of the first and second phases, and said fourth gate means (15d) for eliminating those parts of the control signal for the transistor conducting during the negative half-cycle of the third phase which coincides with the control signals for the transistors conducting during the negative half-cycles of the first and second phases.

6. A frequency converter according to claim 5, wherein the control unit further comprises at least one memory means (10a-10f) for storing modulation control signals.

7. A frequency converter according to claim 5, wherein the control unit further comprises a flywheel diode means (8;16) for enabling a path to be provided for current when the momentary value of current taken from mains and supplied into load in each phase is zero, said path being provided by turning on semiconductor switches of one of the phases when none of the semiconductor switches normally conducts.

8. A method for controlling a frequency converter comprising the following steps:
(a) producing first, second and third phase modulation signals;
(b) removing portions from said second phase modulation signal coinciding with the occurrence of said first phase modulation signal to result in a further second phase modulation signal;
(c) removing portions from said third phase modulation signal coinciding with the occurrence of the first phase modulation signal and said further second phase modulation signal to result in as further third phase modulation signal; and
(d) modulating currents in response to said first phase modulation signal produced by said step (a), said further second phase modulation signal resulting from said step (b), and said further third phase modulation signal resulting from said step (c) to provide current modulation periods corresponding respectively to said first, second and third phases, including the step of interlacing said current modulation periods corresponding to each of said first, second and third phases with said current modulation periods of the others of said first, second and third phases.--

* * * * *